United States Patent [19]

Takizawa et al.

[11] Patent Number: 5,631,665
[45] Date of Patent: May 20, 1997

[54] LIQUID CRYSTAL DEVICE, DRIVING METHOD THEREOF, LIQUID CRYSTAL APPARATUS, AND ILLUMINATION APPARATUS

[75] Inventors: Kuniharu Takizawa; Hideo Fujikake; Tsunehiro Hirabayashi; Yoshiaki Tanaka, all of Tokyo; Kensaku Takata, Osaka; Satoshi Takano, Osaka; Tohru Kashiwagi, Osaka, all of Japan

[73] Assignees: Nippon Hoso Kyokai, Tokyo; Sumitomo Electric Industries, Ltd., Osaka, both of Japan

[21] Appl. No.: 256,259

[22] PCT Filed: Nov. 16, 1992

[86] PCT No.: PCT/JP92/01492

§ 371 Date: Jun. 28, 1994

§ 102(e) Date: Jun. 28, 1994

[87] PCT Pub. No.: WO94/11775

PCT Pub. Date: May 26, 1994

[30] Foreign Application Priority Data

Nov. 13, 1992 [JP] Japan ................... 4-303882

[51] Int. Cl.$^6$ ................................ G09G 3/36
[52] U.S. Cl. .................. 345/88; 345/150; 349/86
[58] Field of Search .................... 345/102, 103, 345/101, 94, 87, 148; 362/26; 359/41, 43, 44, 48, 49, 50, 51, 52

[56] References Cited

U.S. PATENT DOCUMENTS

| | | |
|---|---|---|
| 4,570,204 | 2/1986 | Caimi . |
| 4,613,207 | 9/1986 | Fergason . |
| 4,652,851 | 3/1987 | Lewin ................. 345/102 |
| 4,688,900 | 8/1987 | Doane et al. . |
| 4,693,557 | 9/1987 | Fergason . |

(List continued on next page.)

FOREIGN PATENT DOCUMENTS

| | | |
|---|---|---|
| 0361981 | 4/1990 | European Pat. Off. . |
| 0473090 | 3/1992 | European Pat. Off. . |
| 0511829 | 11/1992 | European Pat. Off. . |
| 2203530 | 5/1974 | France . |
| 59/18925 | 1/1984 | Japan . |

(List continued on next page.)

OTHER PUBLICATIONS

Nuno A. Vaz et al. Dual Frequency Addressing of Polymer-Dispersed Liquid-Crystal Films, J. Appl. Phys. 65(12) Jun. 1989, pp. 5043 to 5050.

Yang et al., "Field-Induced Textures of Polymer-Dispersed Chiral Liquid Crystal Microdroplets"; Liquid Crystals, 1991, vol. 9, No. 2, pp. 245–251.

Lin et al., "Electro-Optic Performance of a PDLC Film utilizing dual frequency addressing", SPIE–Liquid Crystal Materials, Devices, and Applications; Feb. 1992, vol. 1665, pp. 13–19.

Primary Examiner—Steven Saras
Attorney, Agent, or Firm—W. G. Fasse; W. F. Fasse

[57] ABSTRACT

An illumination apparatus includes a liquid crystal device (L) disposed in the optical path of light projected from a light source (P) and a driving circuit (D) connected to the liquid crystal device for applying a special driving voltage to a composite film (1) of the device (L). The applied driving voltage alternately causes the composite film (1) to attain an opaque state and a transparent state. The time periods of the alternating voltage pulses are varied, thereby changing the ratio of the duration of the opaque state to the duration of the transparent state per unit time period, and thus controlling the power of light transmitted through the composite film (1) without undesirably altering the color spectrum of the transmitted light.

27 Claims, 13 Drawing Sheets

U.S. PATENT DOCUMENTS

| | | |
|---|---|---|
| 4,693,560 | 9/1987 | Wiley . |
| 4,791,418 | 12/1988 | Kawahara et al. . |
| 4,818,070 | 4/1989 | Gunjima et al. . |
| 4,878,741 | 11/1989 | Fergason . |
| 4,958,915 | 9/1990 | Okada ................................... 345/102 |
| 5,004,323 | 4/1991 | West . |
| 5,023,603 | 6/1991 | Wakimoto et al. ................. 345/148 |
| 5,023,758 | 6/1991 | Allen et al. . |
| 5,053,764 | 10/1991 | Barbier et al. . |
| 5,168,384 | 12/1992 | Genba . |
| 5,184,117 | 2/1993 | Gauthier ............................... 345/102 |
| 5,307,185 | 4/1994 | Jones et al. ............................. 359/41 |
| 5,353,133 | 10/1994 | Bernkopf . |

FOREIGN PATENT DOCUMENTS

| | | |
|---|---|---|
| 63/098631 | 4/1988 | Japan . |
| 63/91110 | 6/1988 | Japan . |
| 63-189837 | 8/1988 | Japan . |
| 63/197919 | 8/1988 | Japan . |
| 63/253333 | 10/1988 | Japan . |
| 63/259516 | 10/1988 | Japan . |
| 64/25187 | 1/1989 | Japan . |
| 1-91125 | 4/1989 | Japan . |
| 1-255832 | 10/1989 | Japan . |
| 1/285921 | 11/1989 | Japan . |
| 2/099919 | 4/1990 | Japan . |
| 3-92820 | 4/1991 | Japan . |
| 3/293652 | 12/1991 | Japan . |
| 4/51219 | 2/1992 | Japan . |
| 4-119320 | 4/1992 | Japan . |
| 5/094153 | 4/1993 | Japan . |
| 2164776 | 3/1986 | United Kingdom . |
| WO85/04262 | 9/1985 | WIPO . |
| WO9210130 | 6/1992 | WIPO . |

12 11
 1

12 11
 1

LIQUID CRYSTAL DEVICE, DRIVING METHOD THEREOF, LIQUID CRYSTAL APPARATUS, AND ILLUMINATION APPARATUS

CROSS-REFERENCE TO RELATED APPLICATION

This application is related to copending U.S. application Ser. No. 08/122,576, which was filed Sep. 28, 1993, is titled "Liquid Crystal Dimmer Plate and Lighting System Including the Same", and names inventors overlapping with the present application.

BACKGROUND OF THE INVENTION

1. Field of the Invention

The present invention relates to liquid crystal devices for adjusting the transmission of light, a method of driving such devices, and especially an illuminating apparatus incorporating such a liquid crystal device for adjusting illumination light for television or movie filming and photographing, or for a projecting type television receiver, a slide projector or the like.

2. Description of the Related Art

A liquid crystal device using materials such as twisted nematic liquid crystal, super twisted nematic liquid crystal and ferro-electric liquid crystal needs a polarizer which causes a loss of more than 50% of unpolarized light. When a liquid crystal device using any of the above-described materials is used as a light-adjusting element in an illumination apparatus using a high power light source it is inevitable that the polarizer's temperature will be greatly increased due to absorbance of light.

In contrast, a polarizer is not needed in a liquid crystal device having a composite film in which a liquid crystal material fills a series of pores in a film that forms a transparent matrix having a three-dimensional network structure, or in which a liquid crystal material is dispersed in particles in a film that forms a transparent matrix sandwiched between transparent substrates having a pair of transparent conductive films. Therefore, the above-described disadvantage regarding heating of the polarizer is overcome.

In the above-described liquid crystal device, when no voltage is applied, the liquid crystal molecules are in a random state based on the configuration of the interface between the liquid crystal molecules and the transparent matrix, which is known as the anchoring effect. Thus, in that state incident light is scattered and the composite film is opaque. When a voltage, usually a rectangular wave or a sinusoidal wave of about 200 Hz, is applied to the region between the transparent substrates having the pair of transparent conductive films with the composite film held therebetween, the liquid crystal molecules having positive dielectric anisotropy ($\Delta\epsilon$) are oriented in the direction of the electric field and are thereby gradually ordered in a manner increasing light transmittance. Thus, an electro-optic effect is brought about, and a transparent state results. Note that the term "transmittance" generally indicates the ratio of the power of the light emitted from an element, relative to the power of the light incident to the element. However, in the case of a light-scattering type liquid crystal device, the term indicates the ratio of the power of the light emitted in the range of a certain angle, relative to the power of a collimated light incident to the element. The angle may be determined depending upon the condition for using the element. Herein, light transmitted within the range of the angle is referred to as non-scattered light.

In a conventional liquid crystal device using any materials, however, the dependence of the birefringence of the liquid crystal on wavelength basically causes the spectrum of transmitted light to change depending upon the applied voltage state. Furthermore, the spectrum of transmitted light largely fluctuates particularly in a middle state between the opaque state and the transparent state.

Also in the above-described liquid crystal device using the composite film, the relation between the light transmittance in each wavelength and the applied voltage is not constant in a middle state between the opaque state and the transparent state. Moreover, the transmittance at the same voltage greatly fluctuates depending upon the wavelength. Particularly, the light transmittance is greater for longer wavelengths than for shorter wavelengths. Therefore the spectrum of transmitted light greatly fluctuates depending upon the applied voltage. Furthermore, the ratio of transmittance of each wavelength changes depending upon the applied voltage, and therefore the color tone of the transmitted light also changes as the applied voltage changes.

Through a study for the cause of the above described effects, the following has been discovered. Namely, when a voltage is applied to a liquid crystal device the liquid crystal molecules are oriented in the direction of the electric field as described above. However, the intensity of the electric field is insufficient in the middle state between the opaque state and the transparent state, and therefore the orientation of the liquid crystal molecules is disturbed by the above described anchoring effect in the vicinity of the interface of the liquid crystal molecules and the transparent matrix. Accordingly, light of a short wavelength is mainly scattered in a region in the vicinity of the interface, the transmittance of short wavelength light is lower than the transmittance of long wavelength light, and the transmitted light gives a spectrum in which the longer wavelengths prevail.

The dependence of the scattering intensity on the wavelength in turn depends upon the degree of disturbance of the orientation of the liquid crystal molecules, based on the area of the region in which the orientation of the liquid crystal molecules is disturbed, the degree of disturbance of the liquid crystal molecules in the above-described region or the like. The degree of disturbance of the orientation depends on both the applied voltage and the anchoring effect, and therefore the transmittance of each wavelength changes depending upon the applied voltage, thus changing the color tone of the transmitted light.

Therefore, when the above-described liquid crystal device is used as a light adjusting element, it is impossible to obtain light with its shorter wavelengths prevailing, or light without any wavelength dependence i.e. white light, and the color tone of the light cannot be made constant.

Therefore, the above-described liquid crystal device has already been reduced to practice for a display with a function of switching between two states, namely opaque and transparent states, but has not yet been applied to a light-adjusting element capable of sequentially adjusting its light transmittance though such a device has long been desired.

Furthermore, the conventional liquid crystal device is not capable of operating in a high temperature environment of 100° C. or higher.

SUMMARY OF THE INVENTION

The present invention was made as an improvement in view of the above-described situation. It is an object of the invention to provide a method of driving a liquid crystal device that will enable the sequential adjustment of the light transmittance of the liquid crystal device while keeping the distribution of the spectrum of the transmitted light from shifting and the color tone of the transmitted light from abnormally changing. The invention further aims to provide a liquid crystal apparatus employing such a driving method, an illumination apparatus incorporating such a liquid crystal apparatus, and a liquid crystal device capable of operating at a temperature of 100° C. or higher without changing its characteristic.

A method of driving a liquid crystal device according to the present invention solves the above-described problem. The method relates to driving a liquid crystal device in which a composite film is sandwiched between transparent substrates having a pair of transparent conductive films. The composite film comprises a liquid crystal material that fills a series of pores in a film that forms a transparent matrix having a three-dimensional network structure or comprises a liquid crystal material that is dispersed in particles in a film that forms a transparent matrix. In the method, the driving voltage applied across the region between the electrodes described above attains a voltage waveform alternatively switching between first and second voltage states in which the composite film attains an opaque state and a transparent state, respectively. The method further involves changing the time period between both voltage states to change the ratio of the time period of the opaque state to the time period of the transparent state of the composite film per unit time period. In this manner, the power of non-scattered light transmitted through the composite film per unit time period is controlled without substantially changing the spectrum.

The liquid crystal apparatus according to the invention includes a composite film in which a liquid crystal material fills a series of pores in a film that forms a transparent matrix having a three-dimensional network structure, or in which a liquid crystal material is dispersed in particles in a film that forms a transparent matrix. The composite film is sandwiched between transparent substrates having a pair of transparent conductive films. The apparatus further includes a driving circuit for applying a voltage having a waveform alternately switching between voltage states in which the composite film attains an opaque state and a transparent state, respectively, and for changing the time period between both voltage states with an external signal to change the ratio of the time period of the opaque state to the time period of the transparent state of the composite film per unit time period, thereby controlling the power of non-scattered light transmitted through the composite film per unit time period.

Further, an illumination apparatus according to the present invention is characterized by the arrangement of the liquid crystal device of the liquid crystal apparatus as described above in the optical path of light projected from a light source.

Further, as an alternative, the liquid crystal device of the apparatus according to the present invention can have generally the structure described above, but wherein only one or at least one of the substrates is a transparent substrate having a transparent conductive film. This embodiment is characterized in that the liquid crystal material shows a liquid crystal phase and changes from the opaque state to the transparent state in response to a voltage applied across the composite film between the above-described two conductive films at a temperature of at least 100° C. or higher.

According to the present invention implemented by the above-described structure, since the power of non-scattered light transmitted through the composite film per unit time period is determined by the ratio of the time period of the opaque state relative to the time period of the transparent state per unit time period, controlling or adjusting the ratio of the time period of the opaque state relative to the time period of the transparent state permits a continuous adjustment of the level of light transmittance through the composite film ranging from the opaque state to the transparent state. Furthermore, the spectrum distribution of the transmitted light at any selected ratio of the time period of the opaque state relative to the time period of the transparent state per unit time period is substantially identical to the transmittance spectrum in the transparent state. Therefore, there is no possibility that the spectrum distribution of the transmitted light shifts or the color tone of the transmitted light abnormally changes depending upon the applied voltage particularly in a middle state between the opaque state and the transparent state, so that the spectrum distribution becomes substantially constant.

Further, substantially equalizing the respective spectrum distributions of the opaque state and the transparent state further reduces the possibility of a change in the spectrum distribution in the middle state between the opaque state and the transparent state. Furthermore, because the liquid crystal device according to the invention implemented by the above-described structure uses liquid crystal material that has a liquid crystal phase in a temperature range of at least 100° C. or higher and does not use a polarizing plate that has a poor heat resistance, it achieves responsiveness from the opaque state to the transparent state in response to an applied voltage in a temperature environment of 100° C. or higher.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS AND OF THE BEST MODE OF THE INVENTION

Now, the present invention will be described in conjunction with the drawings illustrating one embodiment of a liquid crystal apparatus and an illumination apparatus incorporating the liquid crystal apparatus.

Figure 1A:
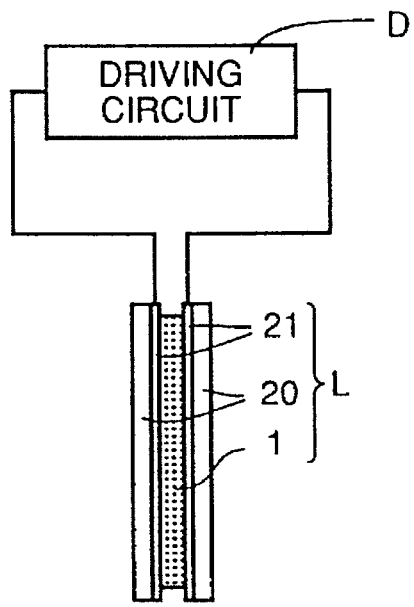
FIG. 1A is a schematic view showing the structure of one embodiment of a liquid crystal apparatus according to the invention.

As illustrated in FIG. 1A, the liquid crystal apparatus of the present embodiment is formed of a liquid crystal device L, and a driving circuit D which controllably drives this liquid crystal device L.

Figure 1B:
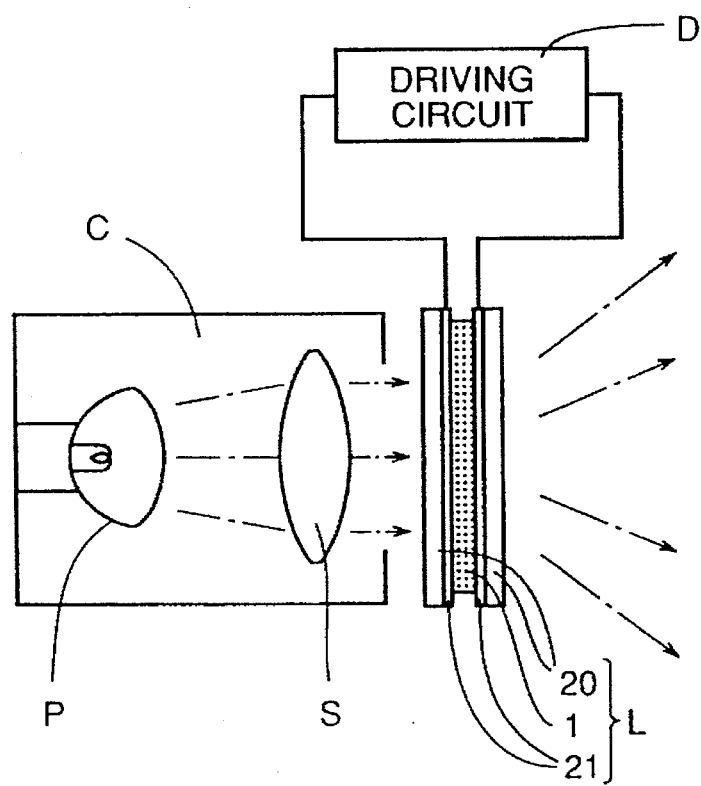
FIG. 1B is a schematic view showing the structure of one embodiment of an illumination apparatus according to the invention incorporating the above-described liquid crystal apparatus.

Further, the illumination apparatus of the embodiment as illustrated in FIG. 1B includes a light source lamp P, a lens S, and a housing or container C for accommodating them, and the liquid crystal device L disposed in the optical path of light projected from light source lamp P as a light adjusting element. Note that in the above-described illumination apparatus, in order to protect liquid crystal device L from ultraviolet rays and infrared rays emitted from light source lamp P, a dielectric multilayer film that reflects these rays may be provided between the light source lamp P and the liquid crystal device L, or such a dielectric multilayer film may be disposed on a surface of the liquid crystal device L on the side facing the light source lamp P. Further, in order to increase the extinction ratio, a plurality of such liquid crystal devices L may be stacked or arranged adjacent one another.

Figure 2:
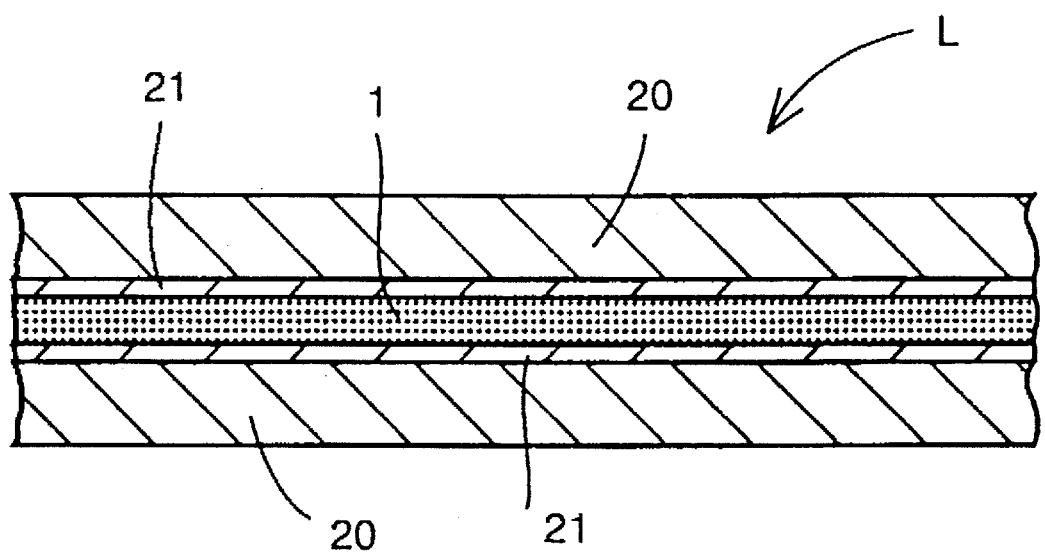
FIG. 2 is a sectional view showing one example of the layered structure of the liquid crystal device used for the liquid crystal apparatus in FIG. 1A.

Liquid crystal device L is formed as illustrated in FIG. 2 by sandwiching a composite film 1 between a pair of transparent substrates 20, 20. However, a transparent conductive film 21 is formed on the surface of transparent substrate 20 in contact with the composite film 1.

Glass, plastic film such as polyethyleneterephthalate (PET) and polyethersulfone (PES) or the like is used for the transparent substrate 20, while a transparent conductive film 21 may be provided by forming a conductive film such as ITO (Indium Tin Oxide) and SnO2 on the surface of transparent substrate 20 by means of deposition, sputtering or coating.

Figure 3A:
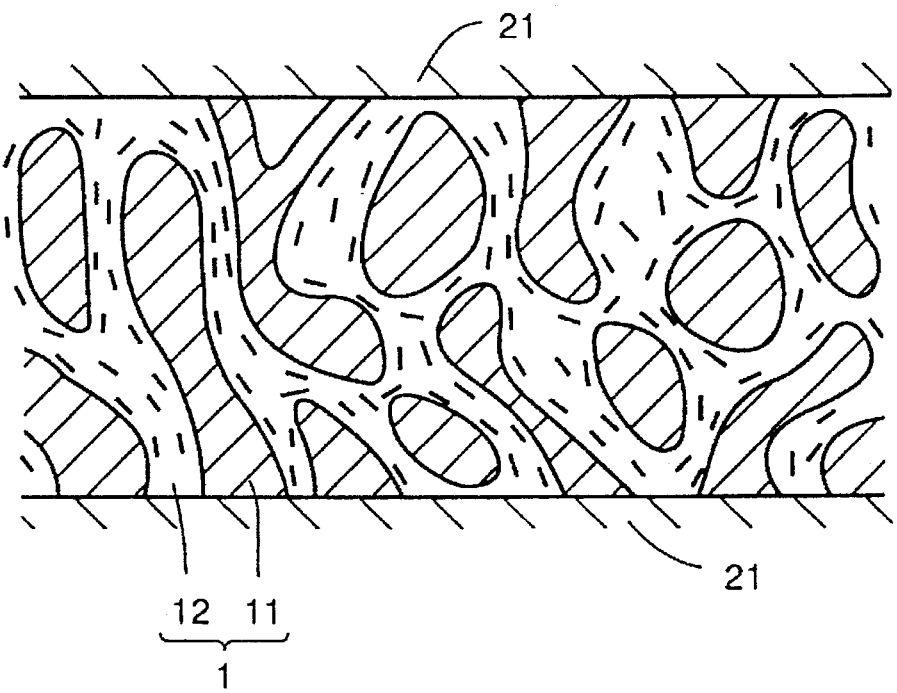
FIGS. 3A and 3B are sectional views respectively showing an enlarged detail view of two different embodiments of part of the composite film of the above-described liquid crystal device.
Figure 3B:
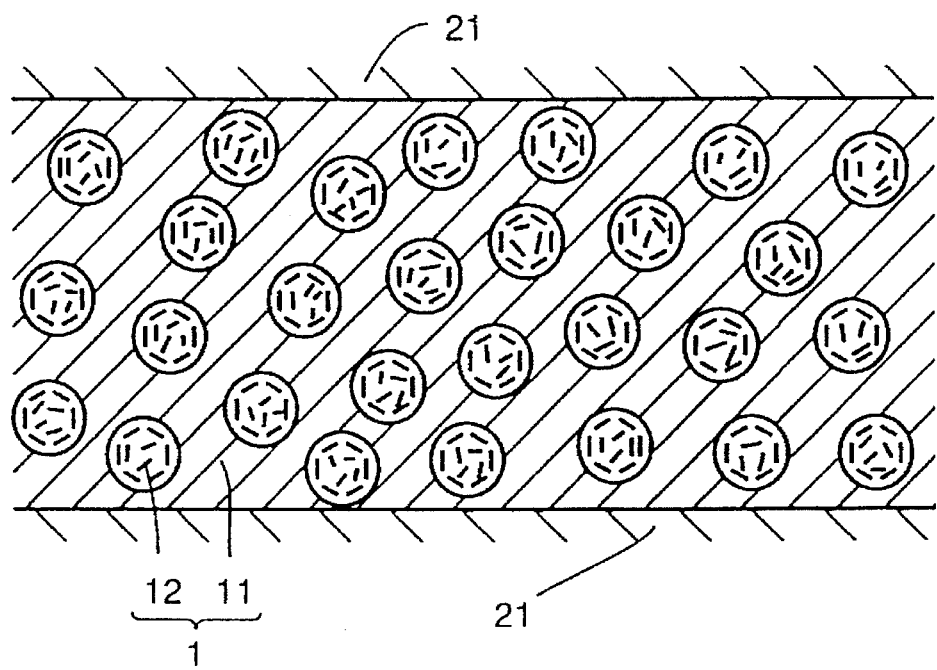

The composite film 1 may be any one of various composite films capable of switching between two stages of optical states, opaque and transparent states, depending upon the state of the electrical input from the above-described transparent conductive films 21, 21. A particular embodiment is illustrated in FIG. 3A, wherein composite film 1 includes a liquid crystal material 12 filled into a series of pores in a film that forms a transparent matrix 11 having a sponge-like structure. FIG. 3B shows an alternative embodiment of the composite film 1, in which liquid crystal material 12 is dispersed in particles in a film that forms a transparent matrix 11. The composite films of these structures are formed, for example, according to any one of the following three methods, which each use transparent substrates 20 that include transparent conductive films 21 that have been respectively formed on a surface of each substrate 20.

i) When the transparent matrix is formed of a polymer, for example, a liquid having the polymer and a liquid crystal material dissolved or dispersed in a suitable solvent is applied onto the surface of a transparent conductive film 21 of a transparent substrate 20. Then, the so-called solvent evaporation method is carried out to evaporate the solvent and separate the polymer and the liquid crystal material from each other, so as to form the composite film. Then, the other transparent substrate 20 is joined onto the surface of the thus formed composite film so that its transparent conductive film 21 comes into contact with the composite film, whereby the liquid crystal device having the layered structure as illustrated in FIG. 2 is completed.

ii) In a suspension method, a milky mixture solution of a hydrophilic polymer such as polyvinyl alcohol and a liquid crystal material is applied onto the surface of the transparent conductive film 21 of one transparent substrate 20, water in the solution is evaporated, and the liquid crystal material is dispersed in the polymer in particles to form a composite film. Then, the other transparent substrate 20 is joined onto the surface of the thus formed composite film so that its transparent conductive film 21 is in contact with the composite film, whereby the liquid crystal device having the layered structure as shown in FIG. 2 is completed.

iii) Further, in a polymerization-induced phase separation method, a mixture solution of polymer precursor (prepolymer), a liquid crystal material, and a polymerization initiator is injected between the transparent conductive films 21 of two transparent substrates 20, and then polymerization and cross-linking reactions are induced by ultraviolet rays or heat, whereby the polymer and the liquid crystal material are separated from each other. Thus, a composite film having the liquid crystal material dispersed in the polymer matrix is formed, and the liquid crystal device having the layered structure shown in FIG. 2 is completed.

The thickness of such a composite film must be at least as large as the wavelength of visible light in order to use a liquid crystal device including the composite film in a system based on controlled light scattering. However, a thickness that is too large excessively increases the driving voltage of the element, and therefore a thickness in the range from about 10 to 30 µm is appropriate in practice.

The liquid crystal material for forming the composite film is not specifically limited, but the use of such a material having a large refractive index anisotropy ($\Delta n$) and a large dielectric anisotropy ($\Delta \epsilon$) is preferred for obtaining excellent characteristics. Further, the liquid crystal material may be any of the materials demonstrating various conventionally known liquid crystal phases such as a nematic liquid crystal phase, a smectic liquid crystal phase, and a chiralnematic liquid crystal phase. For the chiralnematic liquid crystal phase, a cholesteric liquid crystal as well as a mixture of usual nematic liquid crystal and a chiral component such as the above-described cholesteric liquid crystal may be used. Further, in order to provide the liquid crystal with a coloring function, various conventionally known dichroic pigments may be mixed into the liquid crystal.

However, the above-described liquid crystal material is preferably a material having high speed responsiveness that will permit changing from an opaque state to a transparent state or vice versa in response to a pulse-shaped voltage applied to the composite film 1 according to a method of driving a liquid crystal device according to the present invention, which will be described below.

A polymer is mainly used as the transparent matrix 11, i.e. the film material, which, together with the above-described liquid crystal material 12, constitutes the composite film 1. The polymer is preferably one with a high transparency to visible light, for example methacrylic polymer represented by PMMA, epoxy urethane resin or the like. Note that the transparent matrix is not limited to polymers, and may instead be formed of a transparent inorganic material such as glass, or of a polymer having such an inorganic material dispersed therein.

Figure 4B:
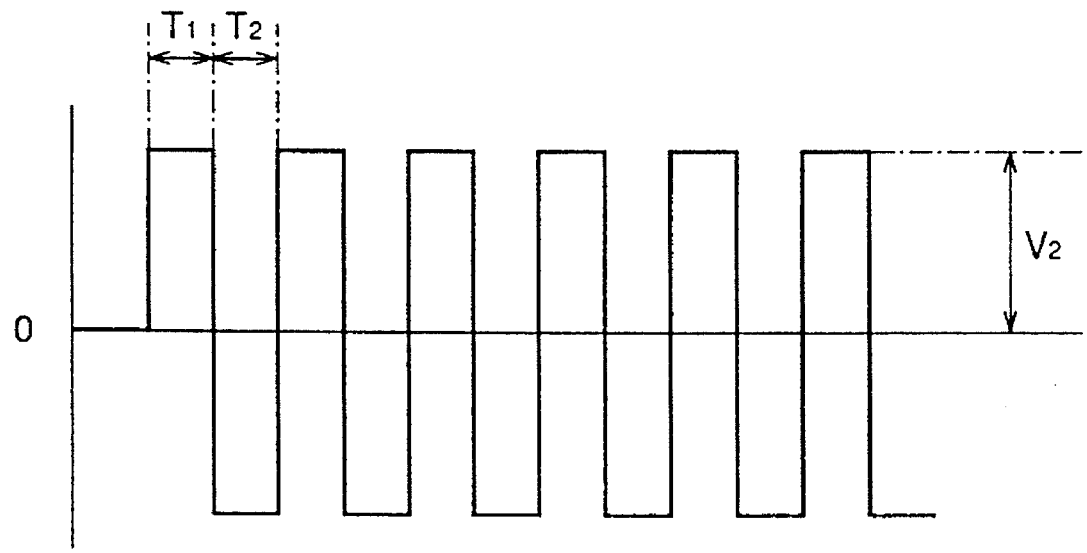
FIG. 4B is a waveform chart showing the waveform of a driving voltage applied to a liquid crystal device in a conventional driving method.
Figure 5:
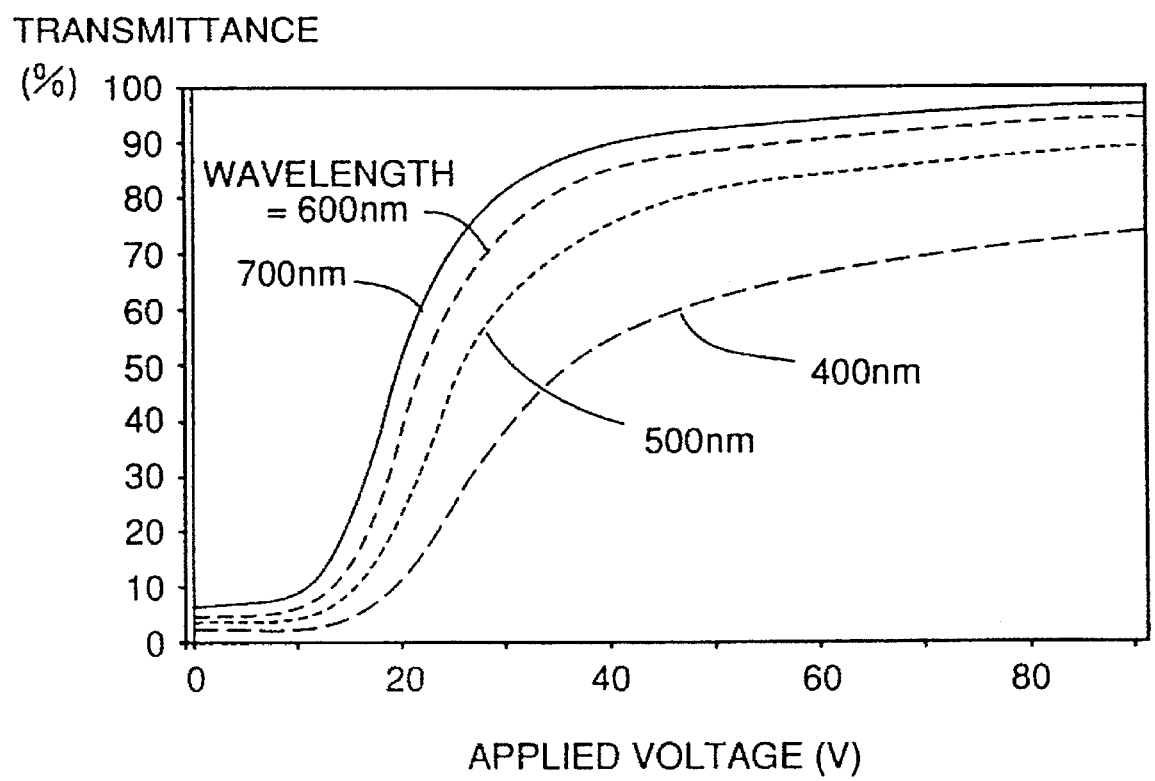
FIG. 5 is a graph showing the relation between applied voltage and light transmittance for several representative wavelengths in liquid crystal devices used in a specific example of the present invention and a comparison example.

In composite film 1 of the above-described structure, the relation set forth in FIG. 5 is established between the transmittance and the applied voltage. More specifically, when no voltage is applied, the liquid crystal molecules are in a random state restricted by the anchoring effect from the transparent matrix, and therefore the composite film 1 is in an opaque state with a low transmittance. However, when a conventional voltage of a positive-negative alternating rectangular waveform, for example as illustrated in FIG. 4B, is applied to the transparent conductive films 21, the liquid crystal molecules that have a positive dielectric anisotropy ($\Delta\epsilon$) are oriented in the direction of the electric field depending on the amplitude of the applied voltage ($V_2$ in FIG. 4B). When the amplitude of the voltage increases, the disturbance of the orientation decreases, and the transmittance increases. If a voltage with a sufficient amplitude is applied to the composite film 1, the film shows a transparent state.

Driving circuit D is used to drive liquid crystal device L operating in accordance with the above-described principle by the driving method according to the invention. To achieve this as illustrated in FIG. 1A, the driving circuit D is electrically connected to the transparent conductive films 21, 21 of the pair of transparent substrates 20, 20 of liquid crystal device L.

Figure 4A:
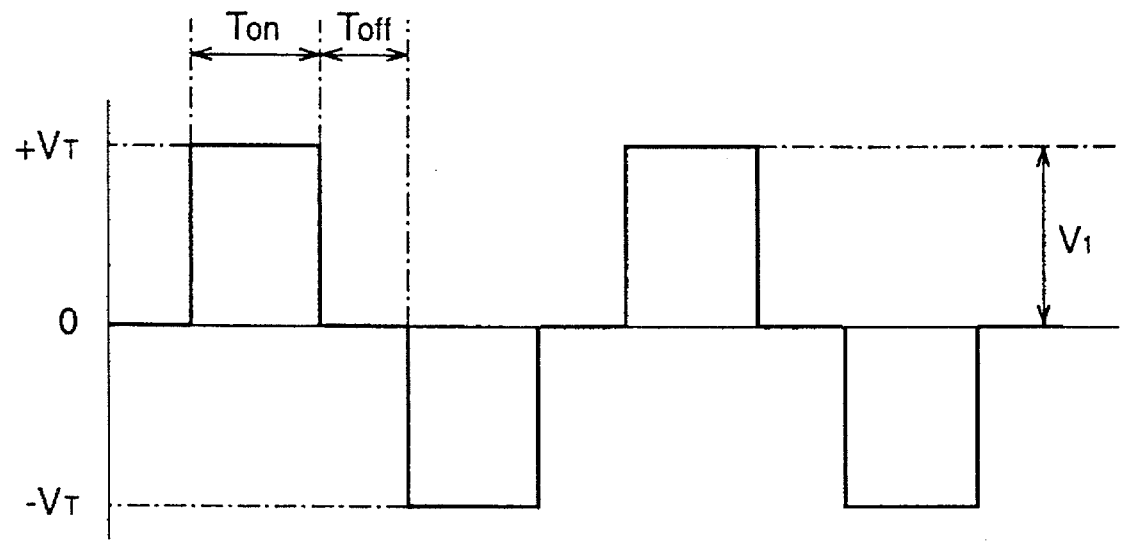
FIG. 4A is a waveform chart showing the waveform of a pulse-shaped driving voltage applied to a liquid crystal device in a method of driving a liquid crystal device according to the invention.

As illustrated by an example in FIG. 4A, the driving voltage applied across the region between the transparent conductive films 21, 21 of the liquid crystal device L by driving circuit D is, according to the invention, a pulse-shaped voltage alternately switching between a first voltage state in which the composite film 1 is brought into an opaque state (0 V in the figure), and a second voltage state sufficient for bringing the composite film 1 into the final transparent state (the state of the applied rectangular waveform voltage alternating positive and negative at $\pm V_T$). When such a pulse-shaped driving voltage is applied, the composite film 1 responds by alternately repeating the opaque state and the transparent state, and the ratio of the two states per unit time period determines the power of the non-scattered light transmitted through the composite film 1 per unit time period.

Accordingly, the power of the non-scattered light transmitted through the composite film 1 per unit time period can be continuously adjusted between the opaque state and the transparent state by inputting an external signal to driving circuit D, which controls the time period of the second voltage state, i.e. the applied voltage state. The ratio of the time period $T_{on}$ of the second voltage state to the total of the time period $T_{on}$ and the time period $T_{off}$ of the first voltage state, i.e. zero voltage, is referred to as the duty ratio and is given by the following expression:

$T_{on}/(T_{on}+T_{off})$=duty ratio.

At that time, the spectrum distribution of the transmitted light is substantially identical to the transmittance spectrum in a substantially transparent state. Thus there is no possibility that the spectrum distribution of the transmitted light will shift and that the color tone of the transmitted light will abnormally change depending upon the applied voltage, particularly in the middle state between the opaque state and the transparent state. Therefore the spectrum distribution becomes substantially constant.

A flicker problem could arise when a liquid crystal apparatus according to the invention is used for illumination control for television or movie filming, or in the light source of a projecting type television receiver, a display, an indoor/outdoor illumination apparatus or other illumination devices. In such applications, flickers are sometimes generated if the frequency of transition between the opaque and transparent states of the composite film 1 is different from the frame frequency of the above described television apparatus or the frequency of the light radiated from the above-described light source apparatus. In order to effectively prevent such a disadvantage, the frequency $f_A$ represented as $1/(T_{on}+T_{off})$ from said time periods ($T_{on}$, $T_{off}$) is set to match the frame frequency $f_C$ of the image sensing apparatus such as the above-described television apparatus, or the frequency $f_B$ of the light radiated from the light source apparatus, or an integer multiple of $f_C$ or $f_B$. As a further alternative the difference between an integer multiple of $f_C$ and an integer multiple of $f_B$ is set higher than the limit frequency of the flickers, i.e. the repeating number of cycles per second at the limit where the flickers are not noticeable.

In order that the composite film 1 repeats the opaque state and the transparent state in response to the high frequency pulsed alternating voltage as described above, the time ($\tau_{on}$) required for switching from the opaque state to the transparent state and the time ($\tau_{off}$) required for switching from the transparent state to the opaque state should be shorter than the above described $T_{on}$ and $T_{off}$, respectively. Among the above mentioned times, $\tau_{on}$ depends largely on the intensity of the applied electric field, and it decreases as the electric field intensity increases. Therefore $\tau_{on}$ can be made shorter than $T_{on}$ by increasing the intensity of the electric field applied to composite film 1.

Meanwhile, since $\tau_{off}$ is less dependent on the electric field intensity, another measure must be considered in order to make $\tau_{off}$ shorter than $T_{off}$. Various measures are effective for shortening $\tau_{off}$, for example: (1) to use a liquid crystal material with a small viscosity and a large elasticity constant, (2) to enhance the anchoring force of the liquid crystal transparent matrix, (3) to reduce the mesh size of the transparent matrix constituting the film, (4) to use a liquid crystal material whose polarity of dielectric anisotropy changes with the frequency, and (5) to use a cholesteric liquid crystal material as disclosed in Japanese Patent Laying-Open No. 4-119320.

Further, since the viscosity of the liquid crystal material is reduced as the temperature of the element increases, and thereby both $\tau_{on}$ and $\tau_{off}$ are shortened, using the element at a high temperature is another effective method. In an illumination apparatus according to the invention, a liquid crystal device L is disposed in the optical path of light projected from a light source lamp P. Therefore the element can be heated to a temperature of 100° C. or higher depending upon the intensity of the light beam passing through the liquid crystal device. In this case, it is necessary for the liquid crystal device L to operate within a temperature range of 100° C. or higher to continue operating normally.

To this end, a liquid crystal material having a liquid crystal phase within a temperature range of at least 100° C. or higher, and preferably 150° C. or higher, should be used. A liquid crystal phase such as a nematic phase and a cholesteric phase is preferable in this case in view of the response time. Although the smectic phase liquid crystal is generally low in response time as compared to the liquid crystals with the above-described two phases, the smectic phase liquid crystal may be used in applications relying on its memory property. Material properties of a liquid crystal such as refractive index anisotropy, dielectric anisotropy, viscosity, elasticity constant, and pitch length in the cholesteric phase generally vary with temperature. Thus, it is desirable to select and use a material having suitable material properties at a temperature of 100° C. or higher, taking into account the change of the refractive index of the transparent matrix or the like. Further, when an inorganic material having high-heat resistance, such as glass or a polymer material, is used for the transparent matrix, it is effective to use such a material having a glass transition temperature of 100° C. or higher, preferably 150° C. or higher, or a cross-linked polymer material.

In order to equalize the respective spectrum distributions of the opaque state and the transparent state, it is appropriate to control the state of dispersion of liquid crystal in the composite film. The spectrum in the transparent state is generally a spectrum near white, for example, as represented by a spectrum at an applied voltage of 100 V in FIG. 8. The composite film shows an opaque state when no voltage or a voltage of a low value is applied, and the opaque state varies depending upon the state of dispersion of the liquid crystal filling, in other words the shape and size of the series of pores or particles. If, for example, the grain or pore size is uniform, a selective scattering phenomenon in which light of a certain wavelength is particularly strongly scattered is sometimes encountered, which impairs the whiteness of the non-scattered light and is therefore not preferable. It would be preferable that the structure of particles or pores is appropriately uneven or the particles or pores are so sized that such selective scattering will not occur in the wavelength band of visible light.

The shape of serial pores or particles can be controlled by controlling manufacturing conditions. Since the size or shape of pores can be controlled, for example, by controlling the solvent evaporation rate in the evaporation separation method as described above for an example embodiment, the respective spectrum distributions of the opaque state and the transparent state can substantially be equalized, by optimizing the temperature, the atmospheric pressure, the kind of solvent, and the composition ratio of a mixture solution used when manufacturing the liquid crystal device. A method for optimization as such can be appropriately selected depending upon the particular manufacturing method used to prepare the composite film.

When a liquid crystal apparatus having the above described structure is used for a liquid crystal display or various illumination apparatus, for example, it is possible to divide composite film 1 into a plurality of segments that can be individually driven according to any desired display pattern. To achieve this, the transparent conductive film 21 of transparent substrate 20 is patterned into a shape corresponding to the above described segments, and driving circuit D is connected to the segments of the film 21 so as to apply a separate driving voltage for every segment.

According to the method of driving a liquid crystal device according to the invention described above, the spectrum distribution of transmitted light can be kept substantially constant, and the transmittance of light through the liquid crystal device can be sequentially, i.e. continuously variably controlled.

Accordingly, when a liquid crystal apparatus according to the invention employing this driving method is used for a light-adjusting window or a display apparatus, for example, the color does not shift in a middle transmittance state, yet the transmittance in the case of the light-adjusting window and the display density in the case of the display device can be sequentially and freely adjusted. Such adjustability is a significant function and not found with conventional techniques.

An illumination apparatus according to the present invention incorporating the above-described liquid crystal apparatus can sequentially and freely control the power of projected light in a continuously variable manner without changing the spectrum of the projected light. The present apparatus can therefore be used for various illumination devices, such as indoor illumination devices, and illumination devices for television or movie filming or photographing, or for an illumination apparatus having a light-adjusting function in a projecting type television receiver, projector, or slide projector.

An example of manufacturing a liquid crystal device will now be described. 70 weight portion of a nematic liquid crystal material (phase transition temperature: 15° C. for crystal layer to nematic phase transition, 170° C. for nematic layer to isotropic phase transition; manufactured by Merk Japan), 25 weight portion of an acrylic polymer material, and 5 weight portion of a cross-linking agent (polyisocyanate; available from Takeda Yakuhin Kogyo, No. A-3) were dissolved into dichloromethane as a solvent to prepare an application liquid with a solute concentration of 20%. The above-described acrylic polymer material is a copolymer of acrylic acid ester containing 20% by weight hydroxyethylmethacrylate as a component, and is crosslinked by a reaction of a terminal OH group of hydroxyethylmethacrylate and the cross-linking agent.

Then, the application liquid was applied onto a glass substrate, on which a transparent conductive film had been formed, by a bar coat method, the solvent was evaporated in air at 1 atm. whereby a composite film as thick as 17 μm was formed, and then the solvent remaining in the composite film was removed by heating to a temperature of 100° C. Another glass substrate having a transparent conductive film identical to the above-mentioned glass substrate was joined onto and pressed into close contact with the composite film under a pressure of about 1 kgf/cm² to manufacture a liquid crystal device.

When a stepped voltage of 150 V was applied between the pair of transparent conductive films of the above described liquid crystal device, the time elapsed until the transmittance reached 90% of a saturation transmittance was measured as the response time $\tau_{on}$ for changing from the opaque state to the transparent state. Then, with the applied voltage at 0 V, the time elapsed until the transmittance attenuated to 10% of the saturation transmittance was measured as the response time $\tau_{off}$ for changing from the transparent state to the opaque state. The results were $\tau_{on}$=0.2 msec, $\tau_{off}$=0.9 msec.

Then the above-described liquid crystal device was set in a spectrophotometer (Model No. UV-160 manufactured by Shimazu Seisakusho), and the relation between the applied voltage and the transmittance of light having wavelengths of 400 nm, 500 nm, 600 nm, and 700 nm was measured by applying a rectangular waveform voltage of 200 Hz across the region between the two transparent conductive films of the transparent substrates in successively increasing 2 V steps starting from 0 V. The obtained result is set forth graphically in FIG. 5. The ordinate in FIG. 5 indicates the transmittance of the device in terms of % normalized for different wavelengths, while the abscissa shows the amplitude of the rectangular waveform voltage.

As shown in FIG. 5, the transmittance of light through the above-described liquid crystal device was below 10% at an applied voltage of 10 V or lower for all wavelengths of light. At an applied voltage of 80 V or higher, the transmittance of light of a wavelength of 500 nm and greater was around 90% of the saturation transmittance of the respective wavelength, in other words a transparent state existed. Further, the relative magnitude of the transmittance of light having the above-mentioned wavelengths changed with voltage, whereby the color tone of the above-described liquid crystal device driven in the above described manner changed in response to the effective value of the applied alternating voltage.

Figure 6:
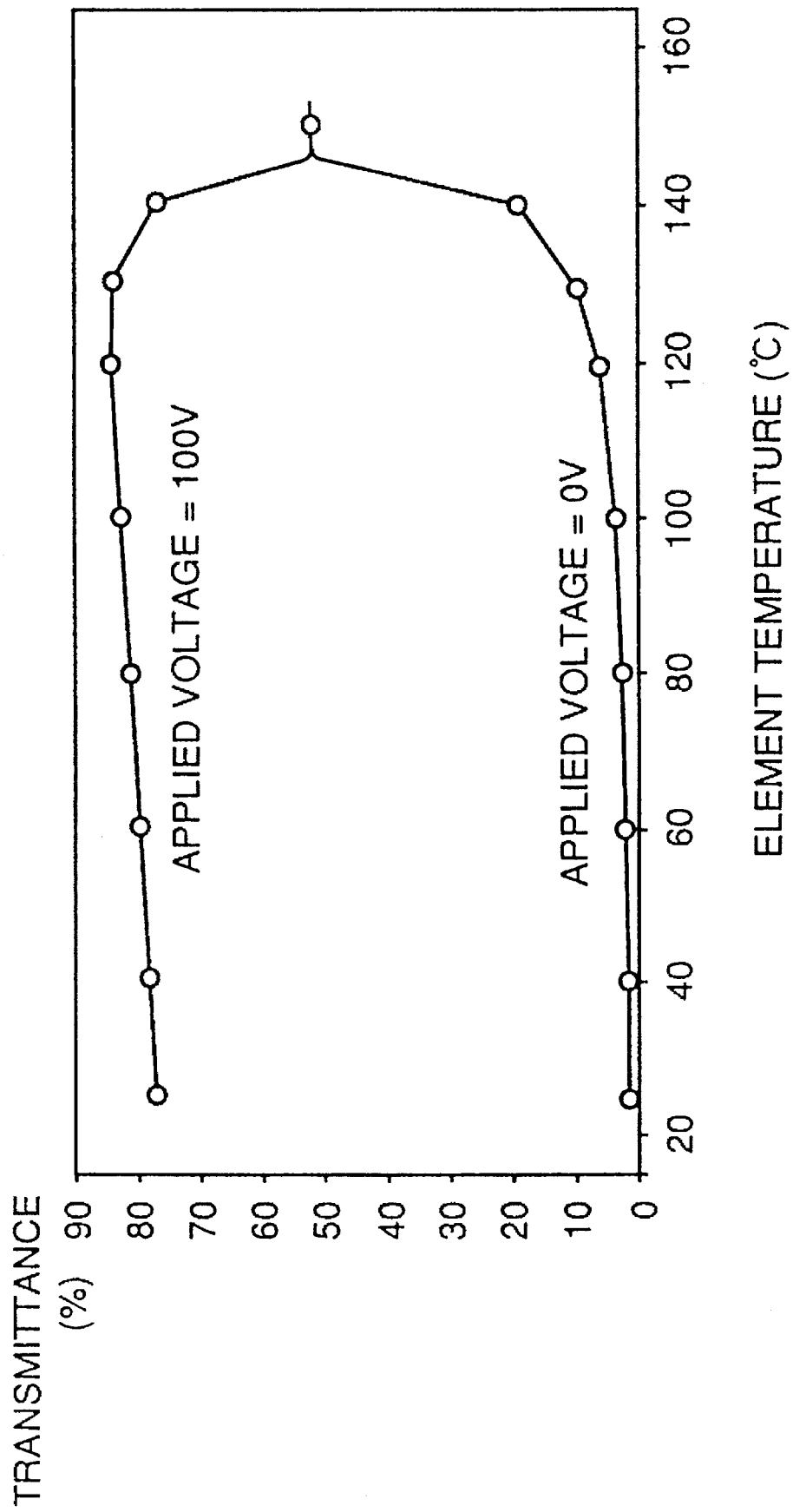
FIG. 6 is a graph showing the relation between the transmittance of light having a wavelength of 600 nm and the temperature of a liquid crystal device used in a specific example of the present invention.

Furthermore, the transmittance of light of 600 nm wavelength through the liquid crystal device was measured at applied voltages of 0 V and 100 V while the temperature of the element was changed between 30° C. and 150° C. As a result, it was found that the responsiveness for changing between opaqueness and transparency in response to the applied voltage was maintained even in the temperature range in excess of 100° C. and up to about 140° C., as shown in FIG. 6.

Figure 7:
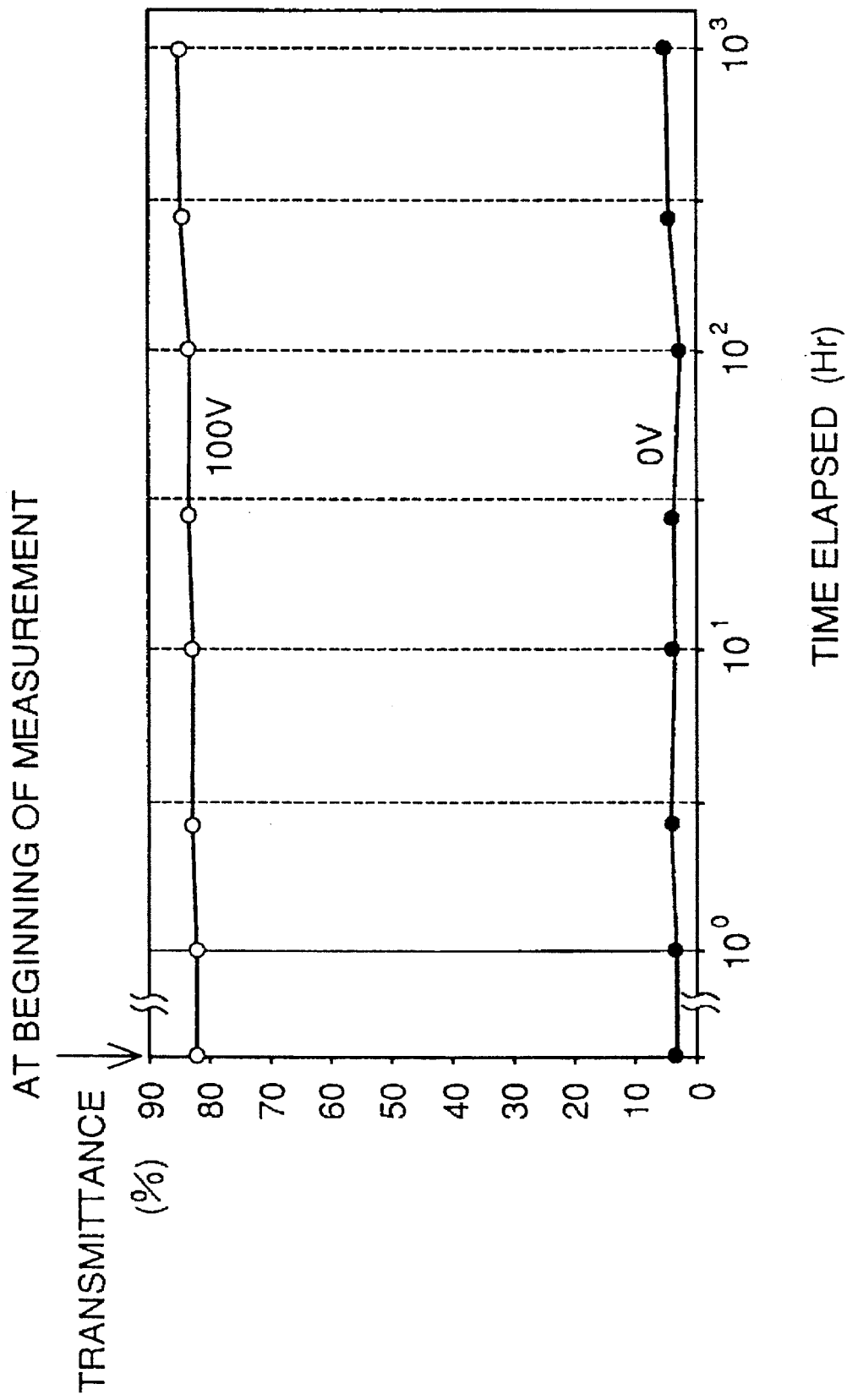
FIG. 7 is a graph showing the relation between the responsiveness of a liquid crystal device and time in a temperature environment of 100° C.

Further, when the liquid crystal device was placed in a temperature environment of 100° C. and the change in responsiveness was examined, as illustrated in FIG. 7, it was found that the respective transmittance at respective applied voltages of 0 V and 100 V did not change after the passage of 1000 hours. Thus, it was found that the element continued to be responsive even after long times at high temperatures.

SPECIFIC EXAMPLE 1

The above-described liquid crystal device was connected to a driving circuit to make a liquid crystal apparatus as shown in FIG. 1A. Then, the liquid crystal device of the liquid crystal apparatus was set into the spectrophotometer in the same manner as above, and a pulse-shaped driving voltage as shown in FIG. 4A (voltage value $V_1$=150 V, $T_{on}$+$T_{off}$=8.33 msec, frequency 120 Hz) was applied by the driving circuit. The duty ratio [=$T_{on}/(T_{on}+T_{off})$] of the applied voltage was changed in a stepped manner ranging from 0/16 to 16/16 in steps of 2/16. The measurement result of the change of the spectrum of transmitted light is set forth in FIG. 8.

Figure 8:
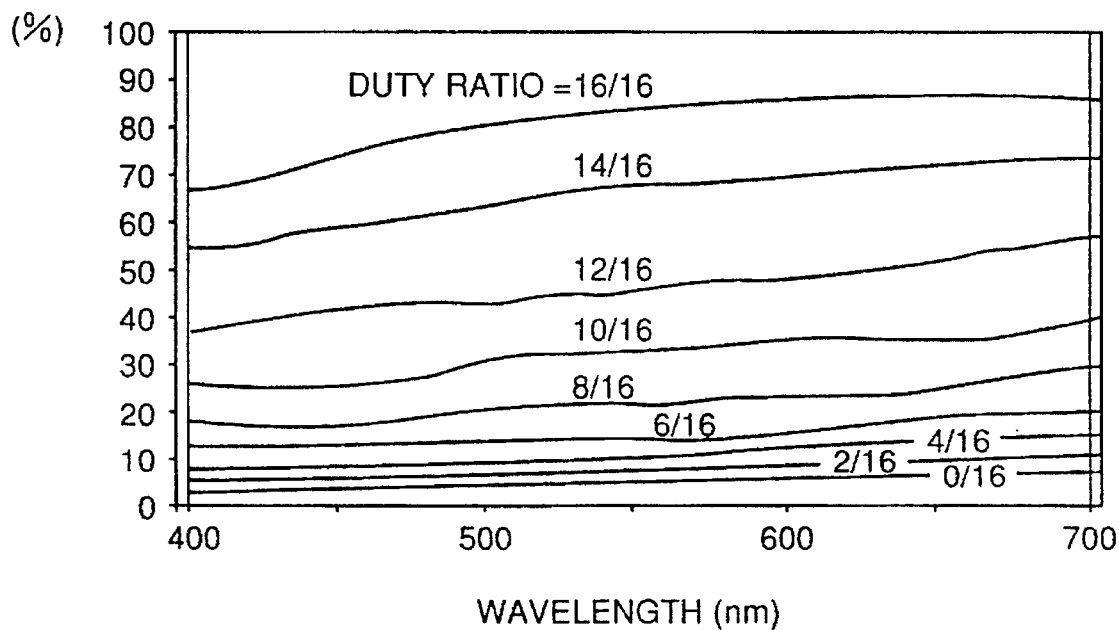
FIG. 8 is a graph showing the relation between the transmittance and the spectrum of transmitted light for different duty ratios of applied voltages in a liquid crystal apparatus in Specific Example 1.

From the result shown in FIG. 8, it was confirmed that the transmittance changes as the duty ratio is changed, but the form of the spectrum distribution of light at each transmittance hardly changes. Therefore the transmittance of light through the liquid crystal device can be adjusted while keeping the spectrum distribution almost constant, using the liquid crystal apparatus of Specific Example 1.

COMPARISON EXAMPLE 1

The above described liquid crystal device was connected to a driving circuit that generated the rectangular waveform voltage shown in FIG. 4B to make a liquid crystal apparatus of Comparison Example 1. Then, the liquid crystal device of the liquid crystal apparatus was set into the same spectrophotometer as above, and a rectangular waveform voltage ($T_1$=$T_2$=2.5 msec, frequency 200 Hz) as shown in FIG. 4B was applied by the driving circuit. The voltage value $V_2$ of the applied voltage was changed to levels shown in FIG. 9. The result of measurement of the change of the spectrum of transmitted light is set forth in FIG. 9.

Figure 9:
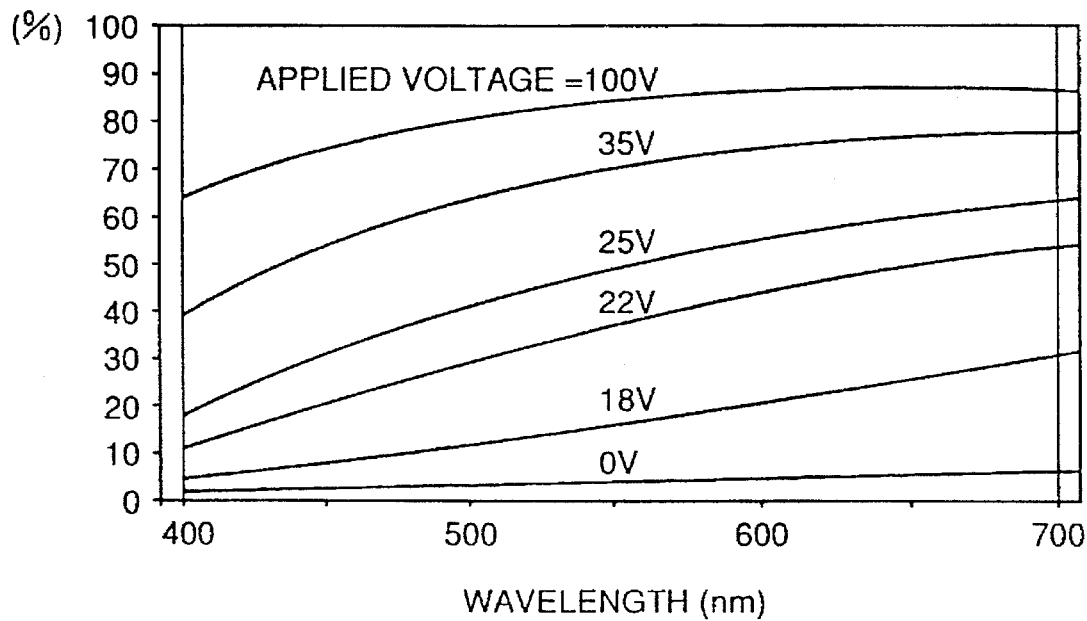
FIG. 9 is a graph showing the relation between the transmittance and the spectrum of transmitted light for different applied voltages in the liquid crystal apparatus of Comparison Example 1.

From the result shown in FIG. 9, it was found that not only does the transmittance change as the voltage is changed, but also the form of the spectrum of light at each transmittance greatly changes.

SPECIFIC EXAMPLE 2

The liquid crystal apparatus of the above Specific Example 1 was combined with a tungsten lamp (300 W) as a light source and a lens to make an illumination apparatus as shown in FIG. 1B. With the lamp lit, the temperature of the liquid crystal device was measured, using a radiation thermometer, as about 100° C.

Figure 10:
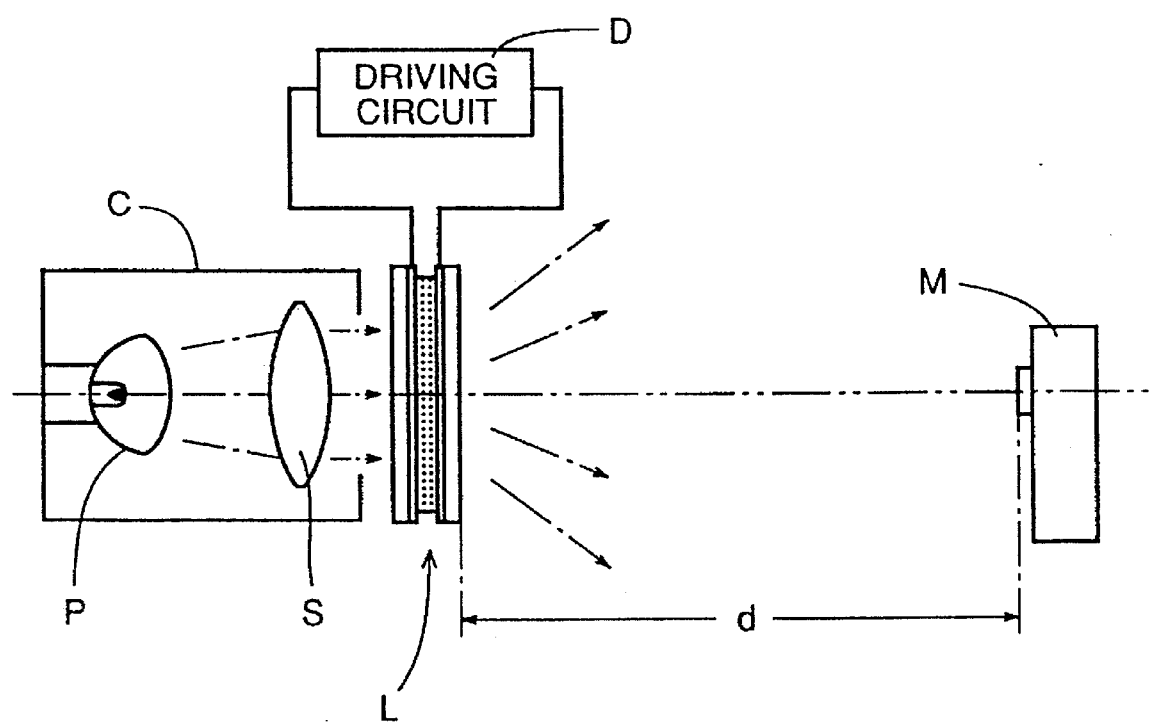
FIG. 10 is a schematic view for illustrating a method of measuring illuminance and color temperature in the illumination apparatuses of Specific Example 2 and Comparison Example 2.

Then, a chrominance colorimeter M was disposed in front of the illumination apparatus in the optical path of light projected from the light source lamp, as shown in FIG. 10. Then, a pulse-shaped driving voltage the same as in the above Specific Example 1 was applied to the liquid crystal device and the duty ratio of the applied voltage was changed in a stepped manner. The illuminance and color temperature were measured at a measuring point in the optical path of the transmitted light at a distance d=1m away from the liquid crystal device L using chrominance colorimeter M. The resultant relation between the duty ratio of the driving voltage and the illuminance is set forth in FIG. 11 and the relation between the illuminance and the color temperature is shown in FIG. 12.

Figure 11:
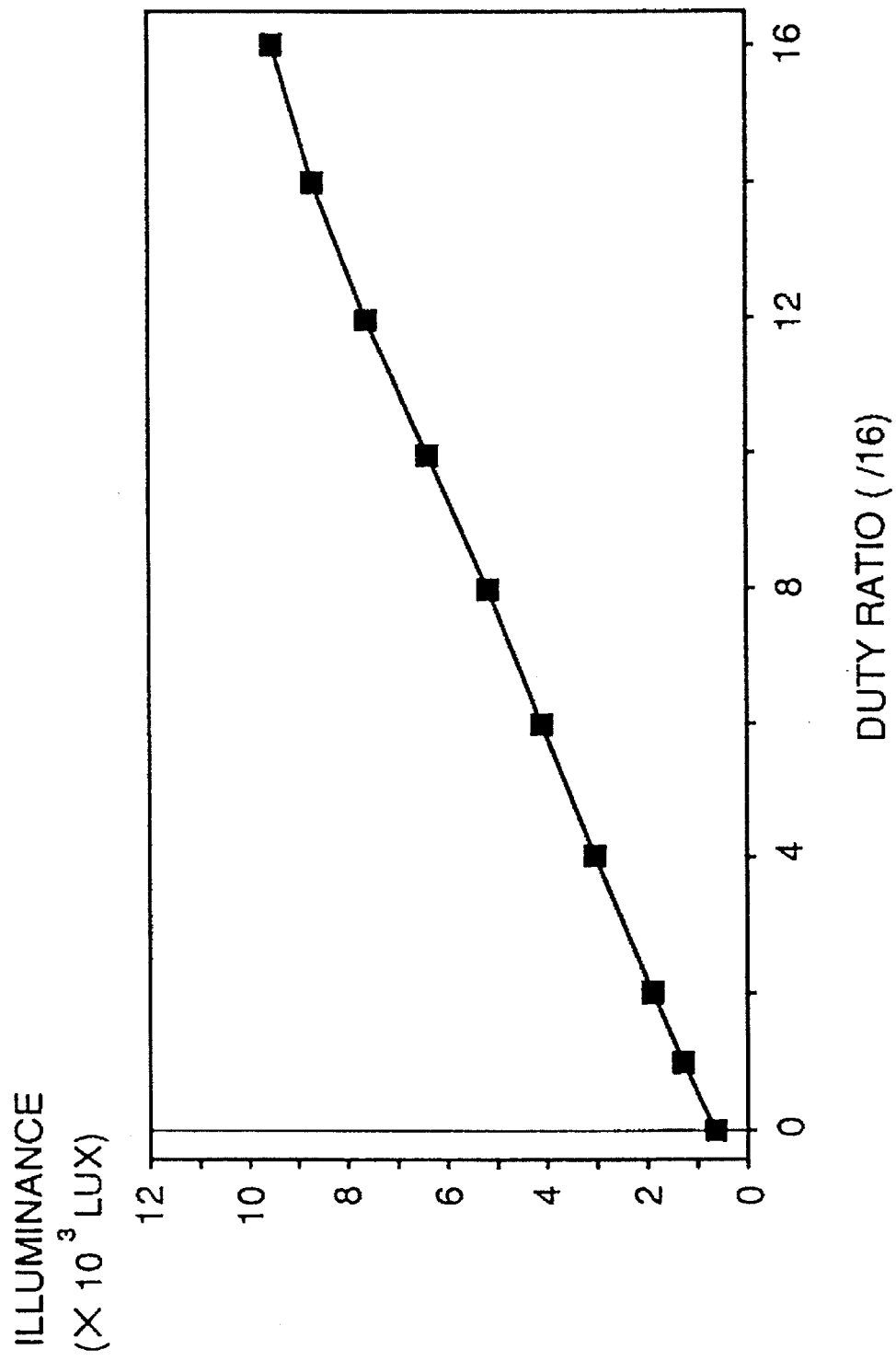
FIG. 11 is a graph showing the relation between the duty ratio of applied voltage and the illuminance of projected light in the illumination apparatus of Specific Example 2.
Figure 12:
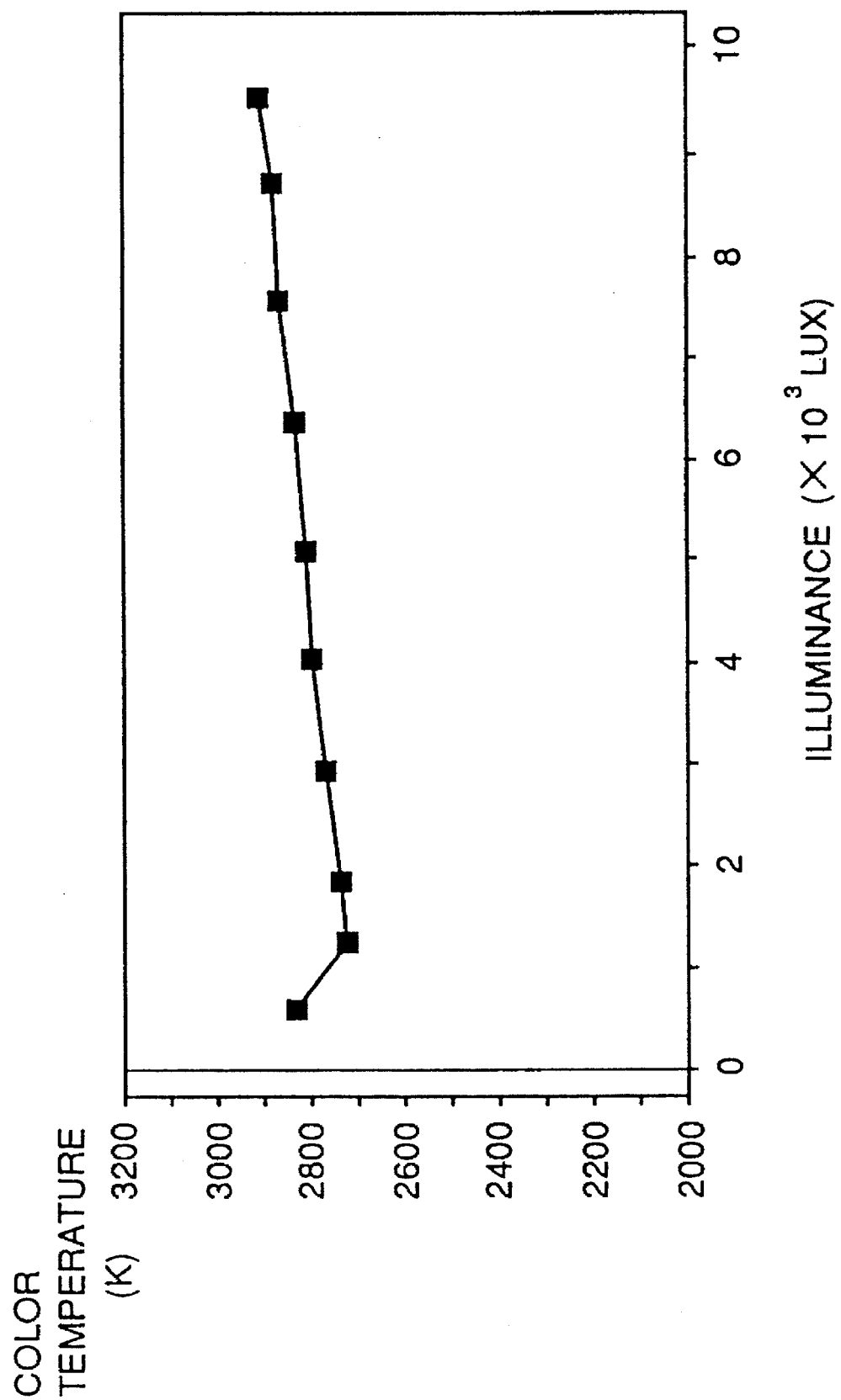
FIG. 12 is a graph showing the relation between the illuminance of projected light and the color temperature in the illumination apparatus of Specific Example 2.

As shown in FIG. 11, the duty ratio of the driving voltage and the illuminance were approximately in a proportional relation to each other, which demonstrated that the illuminance of the projected light can be controlled by changing the duty ratio of the driving voltage in the illumination apparatus of Specific Example 2. Further, as shown in FIG. 12, the color temperature of the projected light hardly changed even if the illuminance was changed. Thereby it was determined that the power of the projected light can be controlled without changing the spectrum of the projected light in the illumination apparatus of Specific Example 2.

COMPARISON EXAMPLE 2

The liquid crystal apparatus of the above Comparison Example 1 was combined with a tungsten lamp (300 W) as a light source and a lens to make an illumination apparatus. A chrominance colorimeter M was disposed in the optical path of the light projected from the light source lamp in front of the illumination apparatus. Then, a rectangular waveform voltage the same as in the above Comparison Example 1 was applied to the liquid crystal device and its voltage value $V_2$ was varied or changed, and the illuminance and color temperature were measured at the same measuring point as for Specific Example 2 using chrominance colorimeter M. The relation between the voltage value of the applied voltage and the illuminance is set forth in FIG. 13, and the relation between the illuminance and the color temperature is set forth in FIG. 14.

Figure 13:
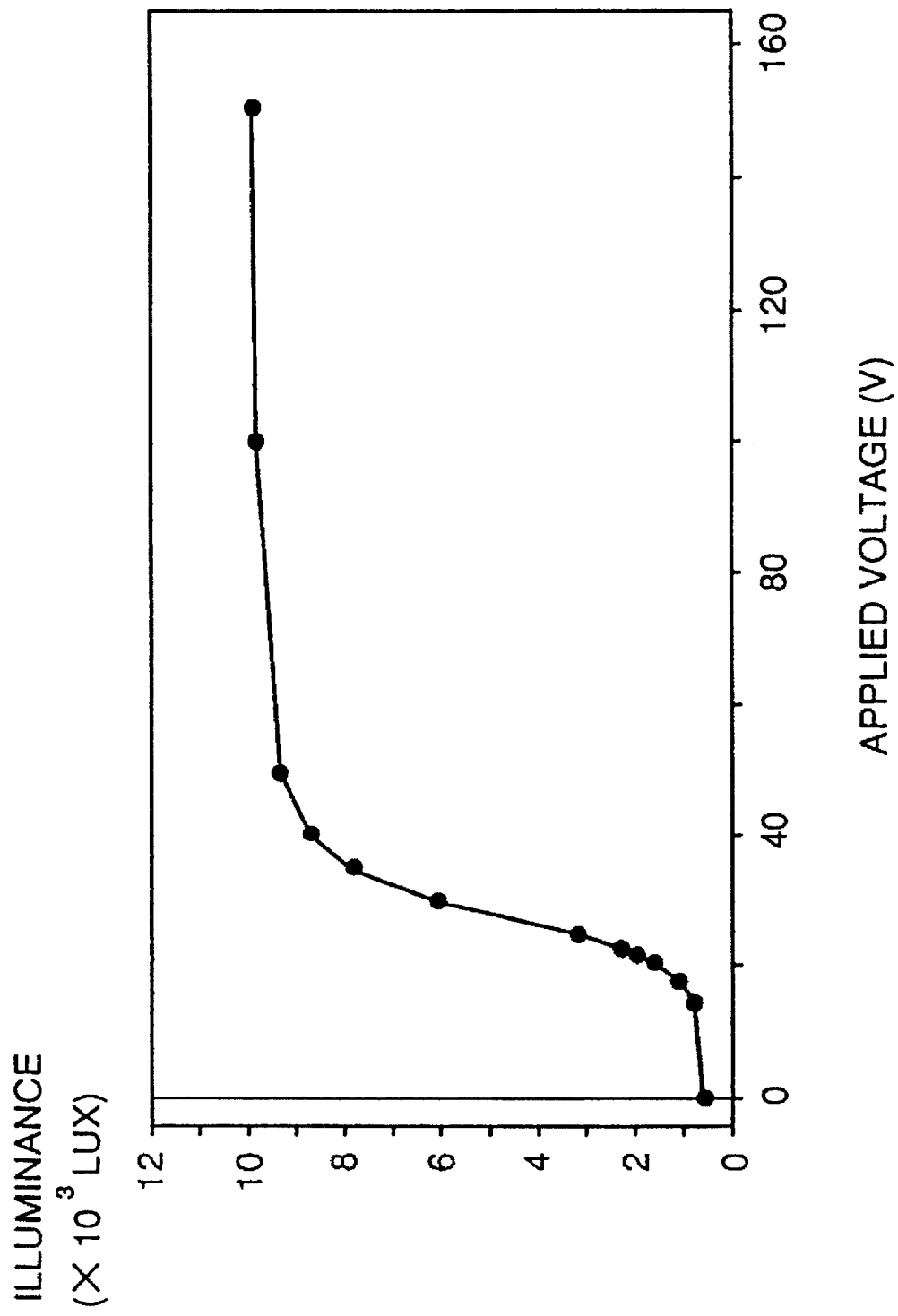
FIG. 13 is a graph showing the relation between the voltage value of applied voltage and the illuminance of projected light in the illumination apparatus of Comparison Example 2.
Figure 14:
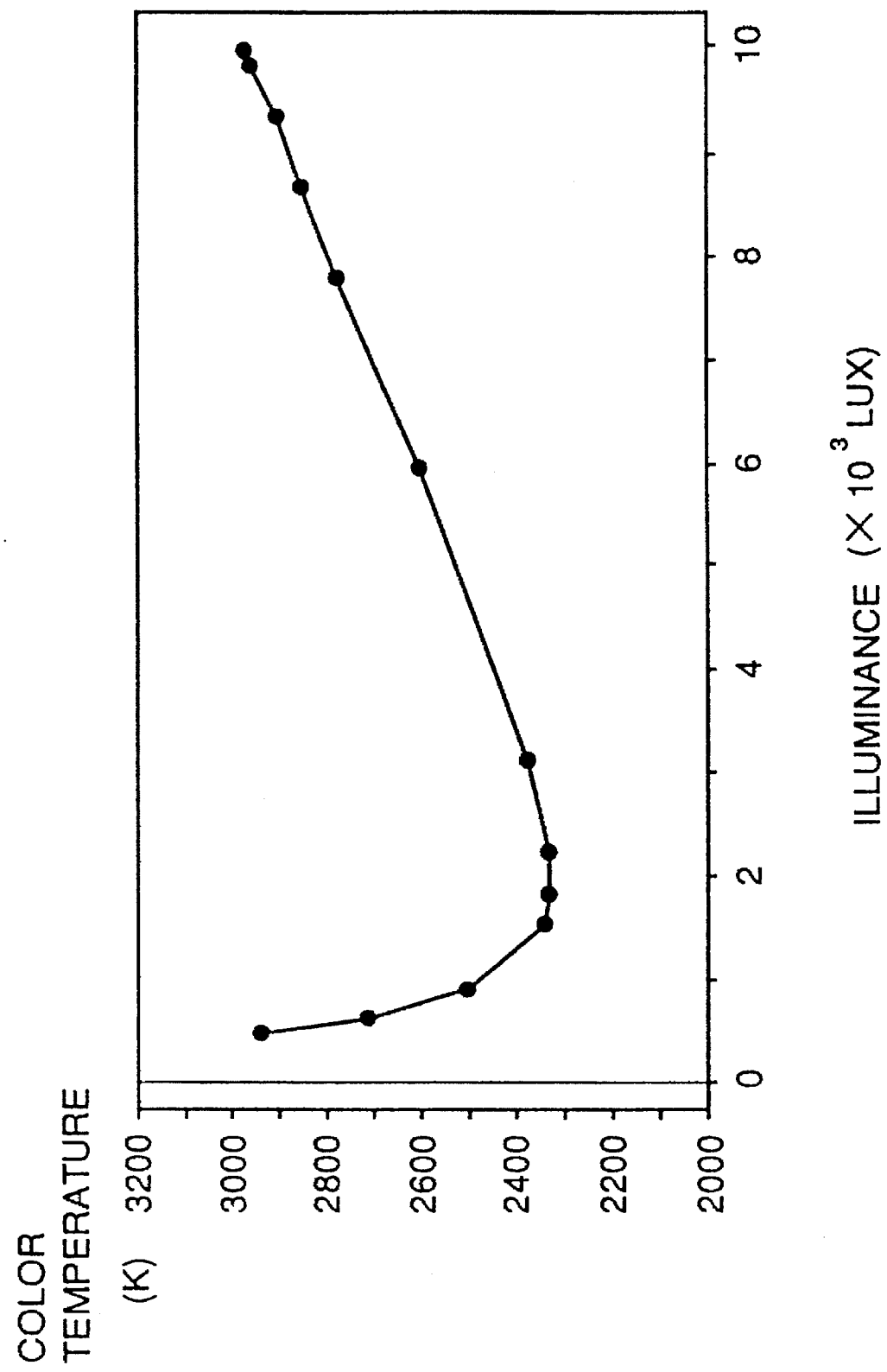
FIG. 14 is a graph showing the relation between the illuminance of projected light and the color temperature in the illumination apparatus of Comparison Example 2.

As shown in FIG. 13, it was found that the illuminance of the projected light can be controlled by changing the voltage value of the applied voltage, but the spectrum of the projected light changes as well, as understood from FIG. 14.

As has been described in detail above, the liquid crystal device according to the invention continues to be responsive in a high temperature environment of 100° C. or higher. Also, by driving a liquid crystal device according to a method of the invention, the transmittance of light through the liquid crystal device can be controlled while keeping the spectrum distribution of the transmitted light almost constant. When the liquid crystal apparatus according to the invention employing the above-described driving method is used for a light-adjusting window or a display, for example, no color shift occurs in the state of intermediate transmittance, and yet the transmittance of the light-adjusting window or the density of the display can be continuously and freely adjusted. Furthermore, in the illumination apparatus of the present invention incorporating the above-described liquid crystal apparatus, the power of the projected light can be continuously and freely controlled without changing the spectrum of the projected light. Accordingly, the illumination apparatus of the invention can be used for various illumination devices, indoor illumination devices, illumination devices for television or movie filming or photographing, or alternatively for a projecting type television receiver, a projector, a slide projector or the like.

Although the invention has been described with reference to specific example embodiments, it will be appreciated that it is intended to cover all modifications and equivalents within the scope of the appended claims.

What is claimed is:

1. An illumination apparatus, comprising:
   a light source;
   a liquid crystal device disposed in an optical path of light projected from said light source and having a composite film including a liquid crystal material and a film forming a transparent matrix receiving said liquid crystal material, and having substrates including a pair of transparent conductive films sandwiching said composite film therebetween; and
   a driving circuit electrically connected to said conductive films and applying thereto an alternating voltage waveform alternately switching between first and second voltage states in which said composite film respectively attains an opaque state and a transparent state, wherein the ratio of the time period ($T_{off}$) of the opaque state to the time period ($T_{on}$) of the transparent state of the composite film per unit time period is varied by pulse width modulation of said alternating voltage waveform for changing the time period of both voltage states with an externally applied signal, thereby controlling the power of non-scattered light transmitted through said composite film per unit time period without substantially changing the spectrum of the transmitted light;
   and wherein said composite film has a non-uniform distribution of said liquid crystal material therein so that the respective spectrum distributions of the opaque state and the transparent state are substantially equal.

2. The illumination apparatus as recited in claim 1, wherein the repeating frequency $f_A$ of the opaque state and the transparent state induced in said liquid crystal device is set equal to a value selected from the group of values consisting of the frequency $f_B$ of light radiated from said light source, the frame frequency $f_C$ of an image sensing apparatus used with said illumination apparatus, an integral multiple of $f_B$, and an integral multiple of $F_C$.

3. The illumination apparatus as recited in claim 1, wherein said liquid crystal material in said liquid crystal device has a liquid crystal phase at a temperature of at least 100° C. and is responsive at said temperature to change from the opaque state to the transparent state in response to said voltage waveform being applied between said conductive films.

4. The illumination apparatus as recited in claim 3, for use in conjunction with an imaging device having a frame frequency $f_C$, wherein the frequency $f_A$ of the alternating voltage waveform is set equal to an integral multiple of $f_C$, and a response time $\tau_{on}$ for switching from the opaque state to the transparent state is shorter than said time period $T_{on}$, and a response time $\tau_{off}$ for switching from the transparent state to the opaque state is shorter than said time period $T_{off}$.

5. The illumination apparatus as recited in claim 1, wherein said film forming a transparent matrix is a cross-linked polymer material.

6. The illumination apparatus as recited in claim 5, wherein said cross-linked polymer is formed of an acrylic polymer material containing polyisocyanate as a cross-linking agent.

7. The illumination apparatus as recited in claim 1, wherein the maximum variation in the color temperature of said non-scattered light transmitted through said composite film is within about 300 K.

8. The illumination apparatus as recited in claim 1, wherein said composite film has a structure of said liquid crystal material filling pores in said matrix film, and wherein said non-uniform distribution of said liquid crystal material is provided in that said pores have at least one of non-uniform sizes, non-uniform shapes, and a non-uniform distribution in said matrix film.

9. The illumination apparatus as recited in claim 8, wherein said matrix film has a three-dimensional network structure including a continuous interconnected series of said pores.

10. The illumination apparatus as recited in claim 9, wherein said network structure of said matrix film is formed by mixing a polymer and a liquid crystal material in a suitable solvent and then evaporating said solvent to separate said polymer and said liquid crystal material.

11. The illumination apparatus as recited in claim 10, wherein said polymer is selected from the group consisting of methacrylic polymer, epoxy resin and urethane resin.

12. The illumination apparatus as recited in claim 10, wherein said composite film includes 25 weight parts of said polymer and 70 weight parts of said liquid crystal material.

13. The illumination apparatus as recited in claim 10, wherein said solvent is dichloromethane.

14. The illumination apparatus of claim 1, wherein said composite film contains no dye.

15. The illumination apparatus of claim 1, wherein $f_A$ defines the repeating frequency of the opaque state and the transparent state induced in said liquid crystal device, $f_B$ defines the frequency of light radiated from said light source, and $f_C$ defines the frame frequency of an image sensing apparatus used with said illumination apparatus, and wherein $f_A$ is so adjusted to obtain a condition selected from the group consisting of the conditions that the difference between $f_A$ and $f_B$ is not less than a critical flicker frequency, and that the difference between $f_A$ and $f_C$ is not less than a critical flicker frequency.

16. The illumination apparatus as recited in claim 1, wherein said composite film has a structure of independent particles of said liquid crystal material dispersed within said matrix film, and wherein said non-uniform distribution of said liquid crystal material is provided in that said particles have at least one of non-uniform sizes, non-uniform shapes, and a non-uniform distribution in said matrix film.

17. An apparatus for controlling the brightness of light transmitted therethrough to intermediate brightness levels between a maximum opaque state and a maximum transmissive state while substantially maintaining in the intermediate brightness levels a nominal color spectrum of the transmitted light in the transmissive state, wherein said apparatus comprises a liquid crystal device that is arranged in the path of the light and that includes a liquid crystal composite film sandwiched between two transparent conductive films, wherein said composite film includes a liquid crystal material non-uniformly dispersed within a transparent matrix film such that said composite film substantially maintains the nominal spectrum of the transmitted light also in the maximum opaque state, and said apparatus further comprises a driving circuit electrically connected to said conductive films and applying across said conductive films an alternating voltage waveform that alternates between a first voltage state for a time $T_{off}$ in which said liquid crystal material is in the maximum opaque state and a second voltage state for a time $T_{on}$ in which said liquid crystal material is in the maximum transmissive state, and that has the ratio of $T_{on}/(T_{on}+T_{off})$ adjusted to achieve a desired intermediate time-averaged perceived brightness level of the light transmitted through said liquid crystal device without substantially altering the spectrum of the transmitted light from the nominal spectrum of the transmitted light in the transmissive state.

18. The apparatus of claim 17, wherein said composite film contains no dye.

19. The apparatus of claim 17, wherein said composite film consists essentially of said liquid crystal material and said transparent matrix film.

20. The apparatus of claim 17, expressly excluding polarizers.

21. The apparatus of claim 17, wherein the maximum variation of the color temperature of the spectrum of transmitted light among all of the intermediate brightness levels is less than about 300 K.

22. The apparatus of claim 17, wherein said liquid crystal material has a liquid crystal phase at a temperature of at least 100° C. and remains responsive to switch between the transmissive state and the opaque state at a temperature of at least 100° C.

23. A method of operating the apparatus of claim 17, comprising:
(a) operating said driving circuit to apply said alternating voltage waveform across said conductive films, wherein said waveform alternates between said first voltage state for said time $T_{off}$ and said second voltage state for said time $T_{on}$, and
(b) modulating a pulse duration of at least one of said first voltage state and said second voltage state to alter the ratio $T_{on}/(T_{on}+T_{off})$ and thereby to adjust the time-averaged power of light transmitted through said composite film to the desired intermediate brightness level.

24. The method of claim 23, further comprising adjusting the repeat frequency of said alternating voltage waveform to equal the frequency of the light or an integral multiple thereof.

25. The method of claim 23, further comprising coupling said apparatus with an image sensing device, and adjusting the repeat frequency of said alternating voltage waveform to equal the frame frequency of the image sensing device or an integral multiple thereof.

26. The apparatus of claim 17, wherein said composite film has a structure of said liquid crystal material filling pores in said matrix film, and wherein said non-uniform dispersion of said liquid crystal material is provided in that said pores have at least one of non-uniform sizes, non-uniform shapes, and a non-uniform distribution in said matrix film.

27. The apparatus of claim 17, wherein said composite film has a structure of independent particles of said liquid crystal material dispersed within said matrix film, and wherein said non-uniform dispersion of said liquid crystal material is provided in that said liquid crystal particles have at least one of non-uniform sizes, non-uniform shapes, and a non-uniform distribution in said matrix film.

* * * * *

UNITED STATES PATENT AND TRADEMARK OFFICE
CERTIFICATE OF CORRECTION

PATENT NO. : 5,631,665
DATED : May 20, 1997
INVENTOR(S) : Takizawa et al.

It is certified that error appears in the above-indentified patent and that said Letters Patent is hereby corrected as shown below:

Col. 13, line 67, replace "$F_c$" by --$f_c$--.

Signed and Sealed this

Fourteenth Day of October, 1997

Attest:

BRUCE LEHMAN

Attesting Officer

Commissioner of Patents and Trademarks